(12) United States Patent
Diego et al.

(10) Patent No.: US 12,070,043 B2
(45) Date of Patent: *Aug. 27, 2024

(54) IMITATION CHEESE WITH IMPROVED MELT

(71) Applicant: Kraft Foods Group Brands LLC, Chicago, IL (US)

(72) Inventors: Patricia J. Diego, Glenview, IL (US); Brian E. LeVine, Northbrook, IL (US); Stacey Ann Hirt, Chicago, IL (US); Judith Gulten Moca, Palatine, IL (US); Andrew Edward McPherson, Mount Prospect, IL (US)

(73) Assignee: Kraft Foods Group Brands LLC, Chicago, IL (US)

( * ) Notice: Subject to any disclaimer, the term of this patent is extended or adjusted under 35 U.S.C. 154(b) by 29 days.

This patent is subject to a terminal disclaimer.

(21) Appl. No.: 17/981,239

(22) Filed: Nov. 4, 2022

(65) Prior Publication Data
US 2023/0060993 A1  Mar. 2, 2023

Related U.S. Application Data

(63) Continuation of application No. 15/737,822, filed as application No. PCT/US2016/039177 on Jun. 24, 2016, now Pat. No. 11,517,024.

(60) Provisional application No. 62/185,333, filed on Jun. 26, 2015.

(51) Int. Cl.
  *A23C 20/00*  (2006.01)
(52) U.S. Cl.
  CPC ............ *A23C 20/005* (2013.01); *A23C 20/00* (2013.01); *A23V 2002/00* (2013.01); *A23V 2200/244* (2013.01); *A23V 2250/1876* (2013.01); *A23V 2250/5118* (2013.01); *A23V 2250/5432* (2013.01)

(58) Field of Classification Search
  None
  See application file for complete search history.

(56) References Cited

U.S. PATENT DOCUMENTS

| | | | |
|---|---|---|---|
| 4,499,116 | A | 2/1985 | Zwiercan et al. |
| 5,486,375 | A | 1/1996 | Yoder et al. |
| 5,747,092 | A | 5/1998 | Carey et al. |
| 5,807,601 | A | 9/1998 | Carpenter et al. |
| 7,229,658 | B1 | 6/2007 | Inoue et al. |
| 2003/0017242 | A1 | 1/2003 | Jacobson et al. |

(Continued)

FOREIGN PATENT DOCUMENTS

| | | |
|---|---|---|
| EP | 0 120 498 A2 | 10/1984 |
| EP | 2 162 011 A1 | 3/2010 |

(Continued)

OTHER PUBLICATIONS

Zwiercan: EP 0120498A1; published Oct. 3, 1984 (Year: 1984).

(Continued)

*Primary Examiner* — Patricia A George

(74) *Attorney, Agent, or Firm* — Fitch, Even, Tabin & Flannery, LLP

(57) ABSTRACT

An imitation cheese composition is provided with improved melt functionality. The imitation cheese composition includes non-interesterified/non-hydrogenated vegetable oils, fractionated vegetable oils, specific corn-derived food starches, specific potato-derived food starches, gelatin, and hydrocolloids.

14 Claims, 6 Drawing Sheets

(56) References Cited

U.S. PATENT DOCUMENTS

2014/0030411 A1     1/2014    Orthoefer et al.
2014/0087052 A1     3/2014    Kawai et al.

FOREIGN PATENT DOCUMENTS

| | | |
|---|---|---|
| EP | 2 789 243 A1 | 10/2014 |
| JP | S59-205940 A | 11/1984 |
| JP | S60-012931 A | 1/1985 |
| JP | H10-42783 A | 2/1998 |
| JP | 2004-357522 A | 12/2004 |
| JP | 2010-022257 A | 2/2010 |
| JP | 2010-081864 A | 4/2010 |
| JP | 2012-075366 A | 4/2012 |
| JP | 2015-065947 A | 4/2015 |
| WO | 2009/005351 A1 | 1/2009 |

OTHER PUBLICATIONS

4C: 4college, Salter's Chemistry: Oils and Fats; published online at least by Nov. 22, 2007 at http://www.4college.co.uk/a/Cd/Oil.php (Year: 2007).

MZ: Zieverink: WO 2009/005351; published Jan. 8, 2009. (Year: 2009).

Tenius: WO 2012/079957; published Jun. 21, 2012. (Year: 2012).

CI: CooksInfo.com: Shortening; published online at least by Aug. 29, 2012 at: https://web.archive.org/web/20120829033823/https://www.cooksinfo.com/shortening. (Year: 2012).

Patent Cooperation Treaty, International Search Report and Written Opinion of the International Searching Authority dated Oct. 4, 2016 for International Application No. PCT/US2016/039177, 12 pages.

Japan Patent Office, Office Action dated Feb. 4, 2020 issued in corresponding Japanese Patent Application No. 2017-556590, 4 pages.

FIG. 5A

Components
A 3-8% fractionated vegetable oils (Revel-A)
B 6-15% non-interesterified/non-hydrogenated veg oils (canola)
C 4-14% of corn derived food starch (Rezista HV)
D 2-12% of potato starch (Perfectamyl)
E 2-4% gelatin
F 0.1-1% hydrocolloids Want to show without 1 or 2 components, system does not function as well.

| Example | | In-Process Viscosity (cps) | Temp when Viscosity was Measured | Viscometer Spindle | Ratio of High Melting TAG: Liquid TAG | Fat:Starch Ratio | Level of Veg Oil |
|---|---|---|---|---|---|---|---|
| 1 | Melt and flavor similar to traditional process cheese | 26480 | 159 F | HA7 | 0.58 | 1.13 | 10.30% |
| 2 | Melt and flavor similar to traditional process cheese (fat types made a difference) | 10400 | 158 F | LV2 | 0.55 | 0.55 | 7.30% |
| 3 | Thinner melt and flavor similar to traditional process cheese (viscosity too low, cheese was too melted at 50%/50% ratio of starches. Not enough potato starch to stabilize high fat. Not enough Rez HV to keep cheese melted and not overly runny.) | 646 | 162 F | LV2 | 0.54 | 1.83 | 14.10% |
| 4 | Poor melt and flavor compared to traditional process cheese (Rez HV and gelatin combo not sufficient; shows starch helps stabilize fat, contributing to melt) | 12490 | | LV2 | 0 | 0.8 | 11.80% |
| Other Examples (Defects in prototype listed below) | | | | | | | |
| 5 | Poor melt (alone, potato starch did not work; needs 0.58 ratio of high melting TGA:liquid TGA) | | | | 0 | | |
| 6 | Gritty, takes a while to break down (shows starch helps stabilize fat, contributing to melt) | 17460 | 170 F | LV2 | 0.55 | | |
| 7 | Really coats mouth, thick in mouth, sticky (fat change made a difference) | 10110 | 159 F | LV2 | 1 | 0.58 | |
| 8 | Poor melt (fat change made a difference) | 11640 | 157 F | LV2 | 1 | 0.58 | |

| Example | Comments | In-Process Viscosity (cps) | Temp when Viscosity was Measured | Viscometer Spindle | Ratio of High Melting TAG: Liquid TAG | Fat:Starch Ratio | Level of Veg Oil |
|---|---|---|---|---|---|---|---|
| 9 | Gritty texture, stickiness to wrapper, chalky slices: 11.9% Revel-A / 9.8% SBO (ratio of high melting TAG:liquid TAG not optimal and is associated with other texture defects) | 6720 | 161 F | LV2 | 1.21 | | |
| 10 | Gritty, wet, soft texture: 9.8% Revel-A/11.9% SBO (ratio of high melting TAG:liquid TAG not optimal and associated with other texture defects) | 6400 | 158 F | LV2 | 0.82 | | |
| | Comments | | | | | | |
| 1 | 15% total starch; 17% fat, 85% Rez HV/15% Perf. | | | | | | |
| 2 | 20% total starch (50/50 blend of Rez HV/Perf), 11.3% total fat | | | | | | |
| 3 | 12% starch (50/50), 22% fat | | | | | | |
| 4 | Without A, D; 15% starch of Flogel and Rez HV | | | | | | |
| 5 | Without A, C, E | | | | | | |
| 6 | Without D (4% Rev/7.3% SBO that works) | | | | | | |
| 7 | Without A, B; Marbase | | | | | | |
| 8 | Without A, B; Sanstrans VLS 30 | | | | | | |
| | Additional Supporting Trends | | | | | | |
| | Matching an anhydrous milk fat (AMF) solid fat content (SFC) curve did not work in our system. AMF works in traditional process cheese. | | | | | | |
| | Optimal ratio of high melting TAG:liquid TAG exists (0.58 works) | | | | | | |
| | Potato starch helps to stabilize the fat, contributing to the melt. | | | | | | |

*FIG. 5B*

IMITATION CHEESE WITH IMPROVED MELT

CROSS-REFERENCE TO RELATED APPLICATIONS

This application is a continuation of U.S. application Ser. No. 15/737,822, filed Dec. 19, 2017, which is a U.S. national phase application filed under 35 U.S.C. § 371 of International Application Number PCT/US2016/039177, filed Jun. 24, 2016, designating the United States, which claims benefit of U.S. Provisional Application No. 62/185,333, filed Jun. 26, 2015.

FIELD OF THE INVENTION

The present application is directed to imitation cheese and, more particularly, to imitation cheese with improved melt through usage of non-dairy fats and varying carbohydrates.

BACKGROUND OF THE INVENTION

Imitation cheeses have been developed to provide an alternative to traditional cheeses. Such imitation cheese may include a number of benefits, such as providing more stability, varying ingredient diversity, and the like. However, many imitation cheeses do not melt or melt poorly due to the usage of interesterified/hydrogenated vegetable oils and food starch. It is hypothesized that esterified fats, which are oftentimes used in imitation cheeses, do not melt well.

While imitation cheeses can make use of a variety of different ingredients and compositions, it is still oftentimes desirable for the imitation cheeses to have certain organoleptic properties, nutritional properties, and functional properties. By attempting to improve one of these properties, for example melt, other properties, such as organoleptic properties, may be adversely impacted.

Further, anhydrous milk fat (AMF) is oftentimes used in various types of cheese products. However, when trying to mimic the solid fat content of AMF, when the same solid fat content was used, it did not provide a satisfactory cheese product with desired organoleptic and functional properties.

In one form, it may be desirable to improve various properties of the imitation cheese as well as the processability of the imitation cheese. For example, amounts of and/or the actual components of the imitation cheese can be manipulated to provide desirable in-process viscosity. In one form, it may be desirable to modify the imitation cheese to provide an in-process viscosity of about 10,000-30,000 cps at 150-175° F. However, when modified to provide this in-process viscosity, the resulting product may not melt or may provide a melt that is too runny. By changing the amounts and/or types of components used in imitation cheese, the viscosity may become too thick or too thin, or otherwise not provide desirable melt performance.

SUMMARY OF THE INVENTION

In one form, an imitation cheese composition is provided with improved melt functionality. The imitation cheese composition includes non-interesterified/non-hydrogenated vegetable oils, fractionated vegetable oils, specific corn-derived food starches, specific potato-derived food starches, gelatin, and hydrocolloids.

According to one form, the imitation cheese composition includes 6-15% liquid vegetable oils at room temperature (in one form, refined, bleached, deodorized vegetable oil), 3-8% fractionated vegetable oils, 4-14% of specific corn-derived food starches, 2-12% of specific potato-derived food starches, 2-4% gelatin, and 0.1-1% hydrocolloids.

In one form, the composition has a solid fat to liquid fat ratio of about 0.3 to about 0.7 at about 25° C.

These and other aspects may be understood more readily from the following description and the appended drawings.

BRIEF DESCRIPTION OF THE DRAWINGS

FIGS. 5A and 5B are a table of viscosity and other texture characterizations for various imitation cheese components and compositions.

DETAILED DESCRIPTION

Figure 1:
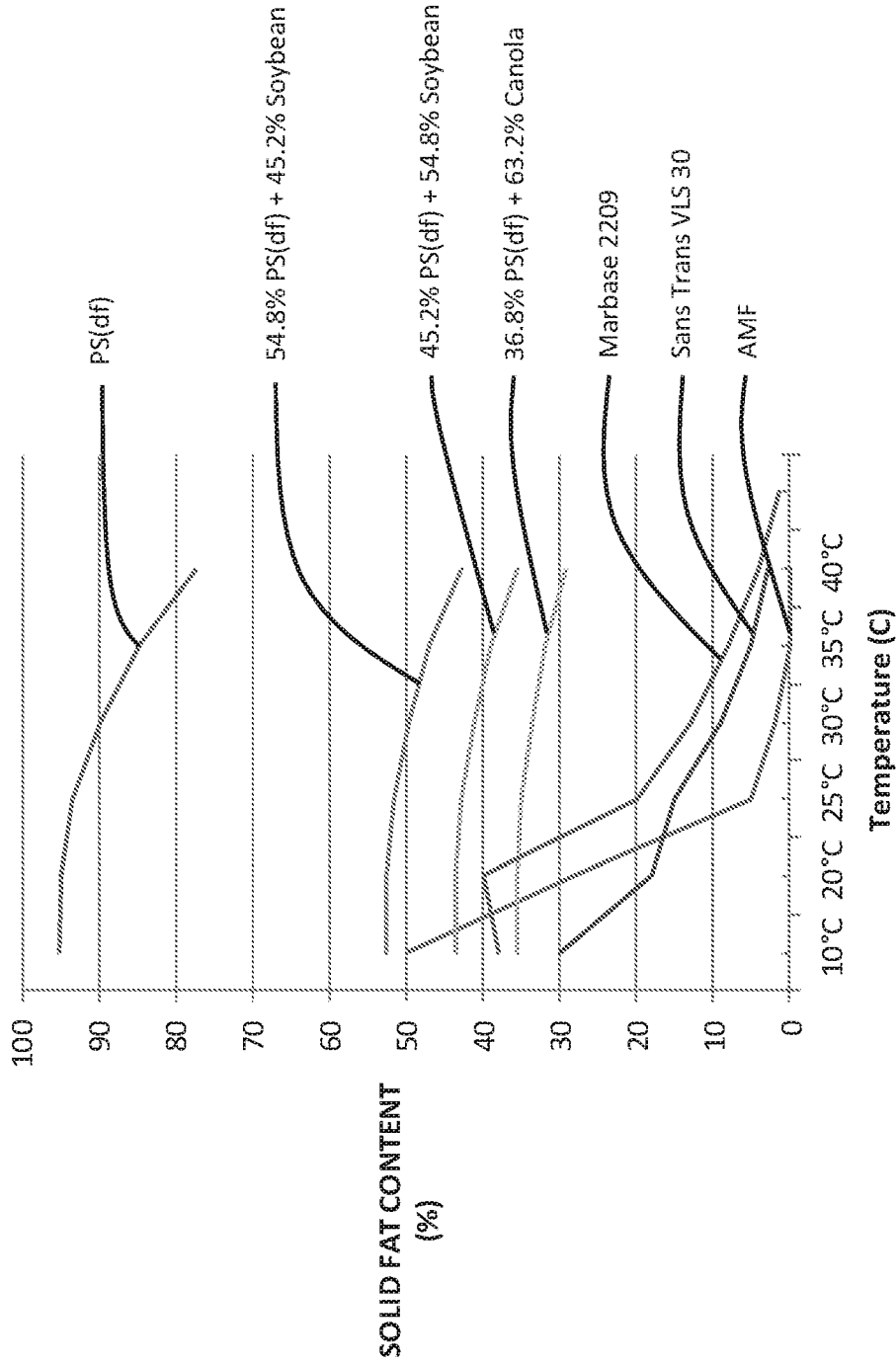
FIG. 1 is a graph showing the solid fat content for various imitation cheese compositions and components.

The present application relates to imitation cheese compositions as well as methods of manufacture. The terms imitation cheese and imitation cheese composition refer to a cheese composition that resembles another cheese and which has lower nutritional qualities than another cheese. Further, such imitation cheese and imitation cheese compositions may be cheese-like products wherein at least part of the fat is a non-milk fat and wherein the solids are at least partially derived from acid or rennet casein or caseinates. These products may, in certain circumstances, contain some non-fat milk solids and some milk fat.

It should be appreciated that imitation cheese and imitation cheese composition may refer to a composition used to make the cheese product or the final product. This may include one or more intermediate compositions prepared during the process of forming a final cheese product. Further, other forms of cheese and cheese related products may incorporate one or more of the features described herein. For example, such products may include substitute cheese, analog cheese, and other cheese and cheese related compositions.

Imitation cheese compositions may be prepared using non-dairy fats and varying levels of carbohydrates. Furthermore, the solid fat content of the fats can be provided such that desired organoleptic properties and functional properties, such as melt, may be maintained for the composition.

In one form, an imitation process cheese is provided which contains no natural or process cheese. Contrary to traditional imitation cheeses, the present formulation seeks to provide improved melt performance by using a combination of ingredients. More specifically, in one form, the composition includes 6-15% non-interesterified/non-hydrogenated vegetable oils in the form of liquid vegetable oils at room temperature, 3-8% fractionated and double fractionated non-interesterified/non-hydrogenated vegetable oils, 4-14% of specific corn-derived food starches, 2-12% of specific potato-derived food starches, 2-4% gelatin, and 0.1-1% hydrocolloids. The amounts listed herein are by weight unless otherwise identified.

The composition can include a variety of different oils and fats to provide the desired organoleptic and functional properties. For example, non-interesterified/non-hydrogenated oils can be used. Such oils can include vegetable oils that are liquid at room temperature, oils that are solid at room temperature, as well as fractionated vegetable oils.

In one form, about 6% to about 15% liquid, non-interesterified/non-hydrogenated vegetable oils can be used in the composition. These oils can include vegetable oils that are liquid at room temperature. In one form, these vegetable oils can include refined, bleached, deodorized vegetable oils. The liquid, non-interesterified/non-hydrogenated vegetable oils can include different materials including, but not limited to, canola oil, soybean, flax, sunflower, grapeseeds, and/or fruit such as avocado, olive etc., and nuts such as almond, peanut oil, hazelnut, super palm olein, and the like, and mixtures thereof. In one form, canola oil is used. In another form, canola oil is used in an amount of about 7% to about 10.5%. According to one form, 10.3% canola oil in combination with 6% palm oil may be suitable, as described below in Example 1 in FIG. 5A. Further, 7.3% soybean oil in combination with 4% palm oil is exemplary of another suitable formulation, such as found in Example 2 in FIG. 5A.

In one form, the liquid non-interesterified/non-hydrogenated vegetable oil can be a physical blend oil with a ratio of solid fat to liquid fat of about 0.3 to about 0.7, when the product is stored at room temperature. In one form, the ratio of liquid oil to solid fat can be about 0.44.

The composition may also include a variety of different fractionated vegetable oils ire varying amounts. In one form, these oils are not liquid at room temperature. In one form, the composition includes about 3% to about 8% fractionated vegetable oils. According to one form, 4-6% fractionated vegetable oils may be chosen. The fractionated vegetable oils can include palm oil, coconut oil, palm kernel oil, shea butter, and combinations thereof. These materials tend to be high in saturate fat and the fractionating process does not tend to remove them. One exemplary fractionated vegetable oil may include a fractionated, non-hydrogenated, refined palm oil of non-lauric origin or double fractionated palm stearine. Such oils may include material such as Revel A made by Loders Croklaan having a melting point about 60° C., an iodine value of 16 max, 0.01% max free fatty acids, and a max peroxide value of 1.

At these levels, it was expected that the fractionated vegetable oils would impart a waxy mouthfeel as the solid fat curves demonstrate a high level of fat solids present at 35-37° C. However, unexpectedly, when used in combination with the other ingredients, there was no appreciable waxy mouthfeel with the imitation cheese. It is hypothesized that the fractionated vegetable oil, such as at the amounts used in the final oil blend, may be interacting with one or more of the other ingredients in the present formulation to reduce the waxy mouthfeel. It may also be possible to use a higher melting fat, such as double fractionated palm stearing, which may be able to stabilize the liquid oil droplets by creating a cushion around protein emulsified oil droplets.

The fractionated vegetable oils chosen have higher melting points and iodine values than dairy fat, providing firmness at refrigerated temperatures for slice integrity while still melting at typical hot application temperatures (>170° F.). The proposed oil blend, in combination with the various starches provide an acceptable cheese slice texture that is independent of the need to use protein and fat aggregates to impart cheese slice textures.

In various embodiments, the fractionated vegetable oils can include fat blends or factions that generally comprise a mixture of one or more solid fat portions or solid fat fractions combined with a liquid oil portion. By one approach, the solid fat fraction may be any solid fat or blends of solid fats with the appropriate solid fat content and/or fatty acid profile. In some approaches, the solid fat portion may include a mixture of at least two palm-based fats (i.e., a first palm-based fat and a second, different palm-based fat). As used herein, a palm-based fat is, in some approaches, a fat obtained primarily from the pulp or mesocarp of the fruit portion of oil palms. In some approaches, the first palm-based fat has a solid fat content greater than the second palm-based fat at both about 25° C. and at about 40° C.

In other approaches, the solid fat portion of the fractionated vegetable oil may include or also be based on a number of different fat types, and in one approach, may be based on or include palm, coconut, rhea butter, diglycerides (like distearate), illipe, kokum, mango kernel, sal, and the like fats. In some approaches, the solid fat portion may be a blend of one or more fat types. In one approach, the fat portion is based on a selection of two or more palm based fats combined with a select amount of soybean oil. The blend of palm-based fats may comprise the first palm-based fat, second palm-based fat, and (in some optional approaches) at least one additional palm-based fat or other fat. The blend of palm-based fats may comprise the first palm-based fat, second palm-based fat, and a third optional palm-based fat. Fractionated palm kernel oil may also be used.

In one form, the solid fat content (SFC) of the composition is about 25 to about 40% at about 25° C. As found in FIG. 1, one form of the composition has a solid fat content of about 28 to about 37% for temperatures of between about 40° C. and 10° C.

SFC measures the quantity of solid fat at a given temperature of a system that contains liquid and solid fat. Matching the SFC of AMF while using a nondairy fat system may influence the texture, mouthfeel, spread ability and melting. The differences in the triglycerides composition, types, morphology and polymorphic behavior may play an additional role while trying to match the dairy fat functionality with a nondairy fat. Therefore matching just the SFC profile does not guarantee matching the triglyceride profile as well. AMF and the nondairy fat blends have complete TAG profiles and types that will consequently result in different physical/chemical properties. In one form, it was found that the best functionality to achieve the desired melting was by using the nondairy fat blend at the suggested level.

The composition can also include various amounts of specific corn-derived food starches. For example, in one form, the composition may include about 4% to about 14% corn-derived starches. According to one form, the composition includes about 8% to about 13% corn-derived starch and in another form, the composition includes about 12.75% corn-derived starch. In one form, the corn derived starches can include cross-linked and/or substituted granular corn starches, thin boiling corn starches, and combinations thereof. One form of corn-derived food starch is a cross-linked and substitutes, propylated waxy maize starch. One such starch is Rezista HV made by Tate & Lyle. Additional materials include Thermflo from Ingredion and PolarTex from Cargill.

Figure 4:
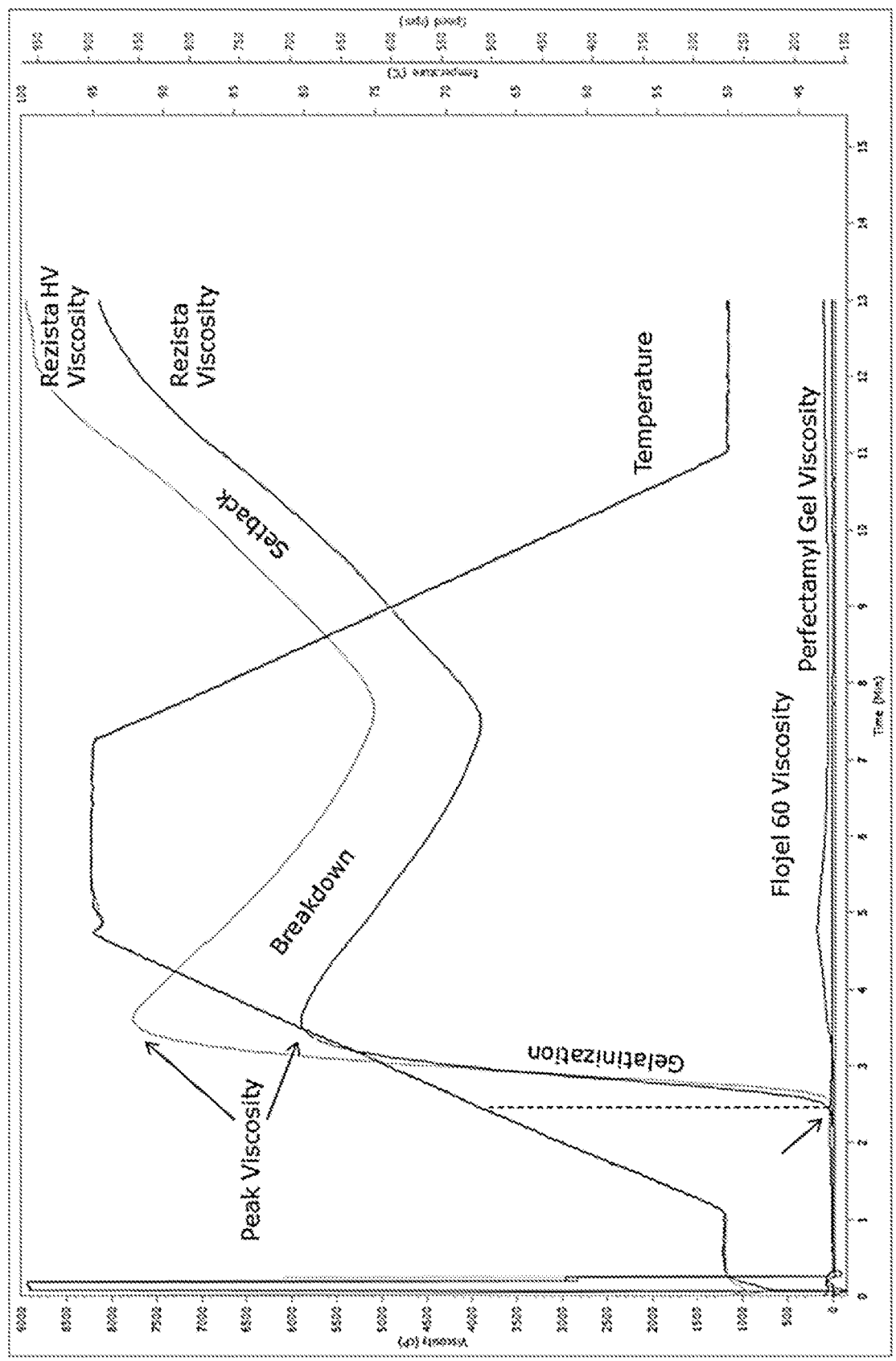
FIG. 4 represents viscosity information for various starches.

In one form, the corn-derived food starches are dual modified, including cross-linking and substitution. According to one form, these starches have been cross-linked to a lesser degree allowing for an increase in swelling capacity and therefore increased in-process viscosity. In one form, if overly cross-linked, granular swelling is reduced, then in-process viscosity is also reduced, such as shown in FIG. 4.

This enables sufficient viscosity for processing and packaging while not impeding melt. In one aspect, waxy starches may be used as normal starches containing amylose may not allowed for the imitation cheese-type products to remelt.

In one form, the corn-derived starches have a particle size of about 25 to about 40 microns. According to one form, the corn-derived starches have a particle size of about 30 microns in diameter. The corn starch may also take other forms such as a gel and the like.

The composition can also include varying amounts of potato-derived food starches. For example, the composition can include about 2% to about 12% potato-derived food starches. In one form, the composition can include about 4% to about 8% potato-derived food starches. Such potato-derived food starches can include cross-linked, substituted, thin boiling, and mixtures thereof. One form of potato-derived starch can include a thin boiling potato starch. Exemplary forms of such a potato starch includes Perfectamyl gel, Perfectamyl Gel EMP, Perfectamyl Gel ACT, and the like made by Avebe Netherlands. It is hypothesized that thin boiling of starches helps provide for smaller linear molecules that enable firm, thermoreversible gels. Thin boiling starches are generally used to provide low hot viscosity solutions that gel into firm matrices upon cooling. In one form, given the use of a granular, modified waxy corn starch to provide hot viscosity in the imitation cheese process, the thin boiling starch, having low viscosity, does not overwhelm the system rheologically. Uniquely, the thin boiling starches after forming a firm gel when cooled have the ability to thermoreversibly melt in an imitation cheese matrix.

The potato-derived starch may take the form of granules, such as having a diameter of about 100-140 micrometers in diameter prior to cooking.

The potato-derived food starches, as compared to corn-derived food starch, have melt enabling properties. This improvement in melt performance is hypothesized to be due to a lower amylose content in potato starch (21%) compared to dent corn (26-32). The longer chain length and larger granule size of potato may also contribute to melt. Additionally, potato starch contains phosphate groups which may react with cations in solution providing improved melt. Granular waxy corn starches are typically excellent water managers and viscosifying agents, whereas the thin boiling starches are good gelling agents in a finished product. In this form, modified waxy maize provides excellent in-process, hot viscosity which enables filling of individual wrapped slices. The thin boiling potato starches provide no hot viscosity but gels in the finished product once cooled, yielding structure but not inhibiting melt. Information concerning the viscosities of these different materials is shown in FIG. 4. Flojel 60 thin boiling normal corn starch.

In one form, the corn-derived starch, such as a dual modified waxy corn starch can be provided in a ratio to the potato-derived of about 1:1 to about 6:1. According to one form, such a ratio may provide a desirable texture in terms of hot viscosity and final slice texture without inhibiting the melt of the slice.

In one form, the fat to starch ratio is about 0.4 to about 1.3. According to one form, the fat to starch ratio is about 1.13. In another form, the ratio is about 0.55.

The composition can also include varying amounts of gelatins and hydrocolloids. In one form, the composition can include about 2% to about 4% gelatin and about 0.1% to about 1% hydrocolloids. According to one form, the composition can include about 2% to about 3.25% gelatin and about 0.3% to about 0.7% hydrocolloids.

Gelatin and the hydrocolloids can be chosen to provide firmness quickly when cooled to refrigeration temperatures and are thermoreversible, contributing to desirable melt properties at typical hot application temperatures (>170° F.).

The composition can include other various components in the imitation cheese composition. For example, the composition can include gums, acids, slats, flavors, and other components.

The imitation cheese composition may take a variety of forms. For example, the imitation cheese can take the forms of slices, blocks, shredded, and the like.

Further, the imitation cheese can come in different varieties including, but not limited to American, cheddar, mozzarella, provolone, Swiss, and the like.

Figure 2:
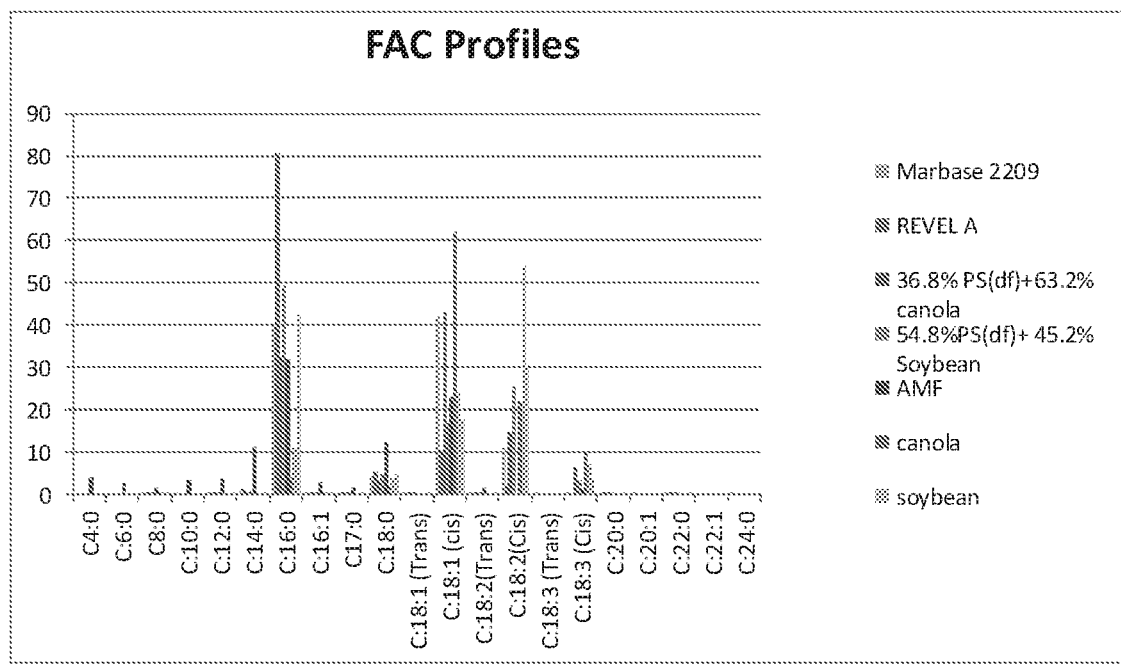
FIG. 2 represents the FAC profiles for various imitation cheese compositions and components.
Figure 3:
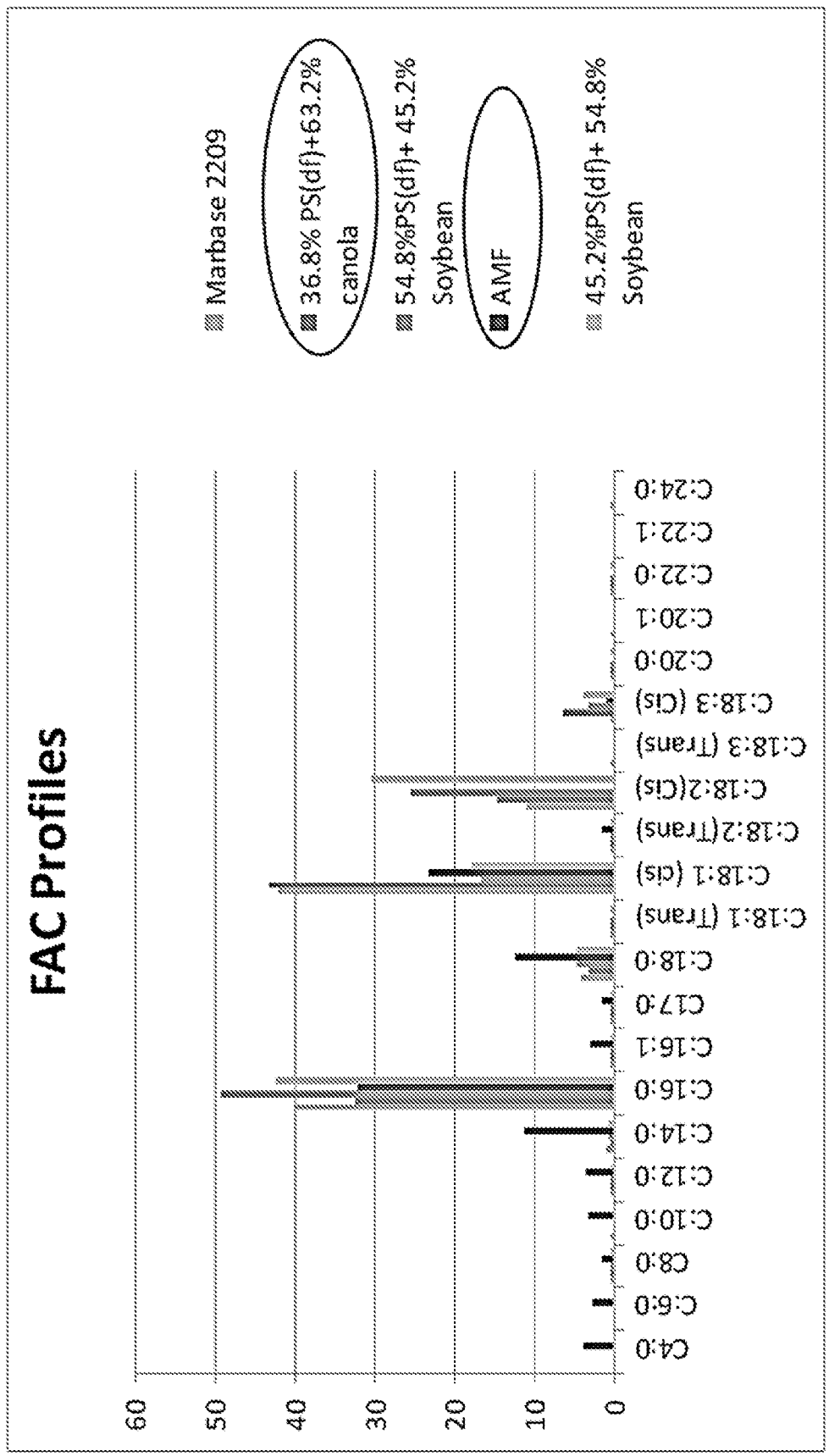
FIG. 3 represents the FAC profiles for various imitation cheese compositions and components.

FIG. 1 represents the solid fat content as a function of temperature for various materials and blends. In one form, it was found that 36.8% palm stearine (dry fractionated) with 632% canola oil provided desired properties when used in an imitation cheese. FIGS. 2 and 3 represent the fatty acid profiles for various materials and blends. This chart demonstrates that matching fat functionality by looking at melting points SFC, levels, etc. in a given food matrix such as cheese may not be sufficient to achieve that fat's functionality while interacting with the other ingredients.

In the figures, AMF stands for anhydrous milk fat which is a food product resulting from the removal of practically all of the moisture and the solids (non-fat) from pasteurized cream or butter. It contains not less than 99.8% fat and not more than 0.1% moisture, and when produced from butter, not more than 0.1% other butter constituents, of which salt is not more than 0.05%. The notation PS(df) stands for palm stearin (dry fractionated) which is a high melting fraction from palm oil. Marbase 2209 is made by Loders Croklaan and is a palm oil margarine base containing less than 2% trans fatty acids and no hydrogenated oils. Sans Trans VLS 30 is a shortening and emulsifier blend made by Loders Croklaan containing palm oil, canola oil, propylene glycol mono and diesters of fats and fatty acids, mono- and diglycerides, soya lecithin, and TBHQ. Flojel is an acid thinned corn starch.

In one form, the viscosity of the composition is 10,000-30,000 cps. at a temperature of about 160° F. When the ranges of components are changed or not included at all, the viscosity may become too thick (too high a cps reading) or too thin (too low a cps reading) for effective processing.

According to one form, melt performance is measured by melting a disc of the final product having a diameter of about ⅞" and a thickness of about ¼" over a double broiler with water at a rolling boil for approximately 4 minutes. In one form, the desired melt results in a disc with diameter >1", but less than 1.75". When the components do not fall within the ranges outlined above or are otherwise not included, melt restriction (melt <1") may be observed, or a thinner melt may result (>1.75"), which is also undesirable.

It should be appreciated that the composition includes both desired in-process viscosity and also final product melt. For example, while it may have been previously possible to provide an imitation cheese with a viscosity in the range of 10,000-30,000 cps is possible, it may not melt or provide a melt that is too runny.

The waxiness of a fat or the fatty mouth coating is caused by the presence of the high melting triglycerides existed in that fat blend mixture. It is hypothesized that a matrix may be formed while cooking the fat with the other ingredients, starch, proteins etc., at the suggested levels and temperatures. From this, a matrix and or network may be formed that is dispersed and minimizes the solid high melting triglycerides crystals to coat the mouth by either being protected by the interaction with the starch and/or both liquid oil and starch.

EXAMPLE 1

The components listed in Table 1 were used to prepare a process cheese composition for Example 1.

TABLE 1

| Component | Amount |
| --- | --- |
| Water | 50.863% |
| Modified corn starch | 12.75% (Rezista HV) |
| Canola oil | 10.31% |
| Palm oil | 6% (Revel A) |
| Dried whey | 3.59% |
| Porkskin gelatin 250 bloom | 3% |
| Modified potato starch | 2.25% (Perfectamyl) |
| Disodium phosphate duohydrate | 2.0% |
| Sodium chloride | 1.84% |
| Tricalcium phosphate | 1.78% |
| Milk protein concentrate-70 | 1.59% |
| Enzyme modified cheese | 2.5% |
| Lactic acid 88% | 0.62% |
| Sorbic acid | 0.18% |
| Xanthan gum | 0.167% |
| Guar gum | 0.167% |
| Locust bean gum | 0.167% |
| Titanium dioxide | 0.1% |
| Natural flavor | 0.06% |
| Annatto | 0.052% |
| Oleoresin paprika | 0.009% |

Example 1 was prepared by blending the milk protein concentrate, canola oil, palm oil, gelatin, sodium chloride, enzyme modified cheeses, disodium phosphate duohydrate, flavor, color, gums, sorbic acid, and a portion of the water. Further, the dried whey, starch, tricalcium phosphate, and a portion of water were combined to create a water mixture. The blend and water mixture were combined and added to a steam injection cooker which was heated to 165° F. Lactic acid (diluted by half with water) was then added. The composition was heated to 165° F. and held for a minimum of 1 minute. The composition was then packaged into slice form and refrigerated to 35-45° F.

In one form, the 0.167% xanthan, 0.167% guar, 0.167% locust bean gum combination was identified as desirable blend of gums to contribute to the firmness of the cold slice. When xanthan, guar, and locust bean gum were each used at 0.1% each, the slice was elastic in texture. When xanthan and locust bean gum only were used at 0.167% each, the slice was sticky in the mouth and formed little balls when chewing. When xanthan and locust bean gum only were used at 0.25% each, the slice was elastic, sticky to teeth, and overall flavor was muted. When xanthan and guar were used at 0.167% each, the slice was sticky to the touch, elastic, and sticky to the teeth. When xanthan and guar only were used at 0.25% each, the slice tore easier and had more snap to it, but the cheese coated the mouth more. When xanthan, guar, and locust bean gum were used at 0.067% each, the tear of the slice was more brittle, and the cheese coated the mouth too much. When xanthan, guar, and locust bean gum were used at 0.033% each, the slice was mouth coating and waxy and gummy in the mouth, delivering a milder than desired flavor.

The melt and flavor profile of Example 1 was similar to traditional process cheese. The melt was tested as outlined above. The flavor profile delivered is milky, buttery, cheesy, and salty, without any significant off-notes or unexpected flavors.

EXAMPLE 2

The components listed in Table 2 were used to prepare a process cheese composition for Example 2.

TABLE 2

| Component | Amount |
| --- | --- |
| Water | 58.27% |
| Modified corn starch | 10% (Rezista HV) |
| Modified potato starch | 10% (Perfectamyl) |
| Soybean oil | 7.26% |
| Palm oil | 4% (Revel A) |
| Porkskin gelatin 250 bloom | 3% |
| Disodium phosphate duohydrate | 2.0% |
| Sodium chloride | 1.97% |
| Milk protein concentrate-70 | 1.59% |
| Enzyme modified cheese | 0.9% |
| Lactic acid 88% | 0.2% |
| Sorbic acid | 0.18% |
| Xanthan gum | 0.167% |
| Guar gum | 0.167% |
| Locust bean gum | 0.167% |
| Natural flavor | 0.06% |
| Annatto | 0.052% |
| Oleoresin paprika | 0.009% |
| EDTA | 0.008% |

The composition of Example 2 was prepared in accordance with the procedure outlined for Example 1.

Example 2 provided similar performance as Example 1 and was similar to traditional process cheese, but the flavor and texture of Example 2 was not as preferred as Example 1. The slice in Example 2 delivered slight stickiness to the back of the teeth. This Example provided a buttery flavor, along with slightly sour notes. The ratio of dfPS to liquid oil changed slightly so it worked towards de-equilibrating the optimum interaction within the whole system.

EXAMPLE 3

The components listed in Table 3 were used to prepare a process cheese composition for Example 3.

TABLE 3

| Component | Amount |
| --- | --- |
| Water | 55.286% |
| Canola oil | 14.10% |
| Palm oil | 7.59% (Revel A) |
| Modified corn starch | 6% (Rezista HV) |
| Modified potato starch | 6% (Perfectamyl) |
| Porkskin gelatin 250 bloom | 3% |
| Disodium phosphate duohydrate | 2.0% |
| Sodium chloride | 1.97% |
| Milk protein concentrate-70 | 1.59% |
| Enzyme modified cheese | 0.9% |
| Lactic acid 88% | 0.75% |
| Sorbic acid | 0.18% |
| Xanthan gum | 0.167% |
| Guar gum | 0.167% |
| Locust bean gum | 0.167% |
| Natural flavor | 0.06% |
| Annatto | 0.052% |
| Oleoresin paprika | 0.009% |
| EDTA | 0.008% |

The composition of Example 3 was prepared in accordance with the procedure outlined for Example 1.

Example 3 had a thinner melt and similar flavor as traditional process cheese, but was not as preferred as either Example 1 or Example 2. Example 3 was slightly slimy to the touch, pasty, stuck to the teeth a bit, and was sticky. The ratio of df PS to liquid oil changed slightly so it worked towards de-equilibrating the optimum interaction within the whole system.

EXAMPLE 4

The components listed in Table 4 were used to prepare a process cheese composition for Example 4.

TABLE 4

| Component | Amount |
| --- | --- |
| Water | 63.113% |
| Modified corn starch | 8.975% (Rezista HV) |
| Modified corn starch | 5.975% (Flojel 60) |
| Soybean oil | 11.77% |
| Porkskin gelatin 250 bloom | 3% |
| Disodium phosphate duohydrate | 2.0% |
| Sodium chloride | 1.98% |
| Milk protein concentrate-70 | 1.59% |
| Enzyme modified cheese | 0.6% |
| Lactic acid 88% | 0.2% |
| Sorbic acid | 0.18% |
| Xanthan gum | 0.167% |
| Guar gum | 0.167% |
| Locust bean gum | 0.167% |
| Natural flavor | 0.05% |
| Annatto | 0.052% |
| Oleoresin paprika | 0.009% |
| EDTA | 0.005% |

The composition of Example 4 was prepared in accordance with the procedure outlined for Example 1.

Example 4 had poor melt and flavor compared to process cheese and was not as preferred as Examples 1 and 2. It should be noted that Example 4 did not include potato-derived starch or palm oil.

Referring to FIG. 5, additional examples were prepared to determine how changes in one or more components impacted the final product performance and in-process viscosity. The comments and trends shown on FIG. 5B are applicable to examples found in FIGS. 5A and 5B. Examples 5 through 10 have one or more components removed therefrom or otherwise falling outside of the desired range. As described above, 3-8% fractionated vegetable oils are preferred in the composition. In Example 9, when 11.9% Revel-A (fractionated vegetable oil) is used, product defects result. The cheese has a gritty vs. smooth texture, the slices are chalky, and the cheese sticks to the wrapper. In Example 10, 9.8% Revel-A is used, and the finished product cheese has a wet, gritty, and soft texture.

Example 5, in addition to its poor melt, had a very soft cold texture and lacked cheese flavor. Example 7 was overly thick in texture in the mouth and was a rubbery slice out of the package. Example 8, in addition to its poor melt, had a pasty breakdown in the mouth, and flavor defects included starchiness, bitterness, and metallic off notes. Example 10, in addition to its other defects, delivered an astringent flavor. Additionally, the resulting mixture of different TAGs (triglycerides) did not favor the desired finished product attributes due to lack of structure and/or ability to coat liquid oil droplets and/or interact with starch, proteins.

As seen from the above examples, as one or more of the combination of non-interesterified/non-hydrogenated vegetable oils, fractionated vegetable oils specific corn-derived food starches, and specific potato-derived food starches is modified, the properties of the imitation cheese begin to degrade. As understood from the above description and figures, matching the solid fat content of anhydrous milk fat, such as used in traditional process cheese, did not provide the desired properties for an imitation cheese composition. Further, a ratio of high melting TAG having a minimum mettle melting point of 60° C. to liquid TAG having a solidification point of 10° C. to about −16° C. of about 0.3 to about 0.7, such as about 0.44 fat solids at 25° C. may provide suitable properties. Additionally, it is hypothesized that potato-derived starch may help to stabilize the fat, contributing to the melt.

The matter set forth in the foregoing description and accompanying drawings is offered by way of illustration only and not as a limitation. While particular embodiments have been shown and described, it will be apparent to those skilled in the art that changes and modifications may be made without departing from the broader aspects of applicants' contribution. The actual scope of the protection sought is intended to be defined in the following claims when viewed in their proper perspective based on the prior art.

What is claimed is:

1. An imitation cheese composition comprising:
    about 6 wt. % to about 15 wt. % liquid, non-interesterified/non-hydrogenated vegetable oil based on the total imitation cheese composition;
    about 3 wt. % to about 8 wt. % fractionated vegetable oil based on the total imitation cheese composition;
    corn-derived food starch; and
    about 2 to about 12 wt % potato-derived food starch,
    wherein the composition has a solid fat to liquid fat ratio of about 0.3 to about 0.7 at about 25° C.

2. The imitation cheese composition of claim 1 further comprising about 2 wt. % to about 4 wt. % gelatin.

3. The imitation cheese composition of claim 1 further comprising about 0.1 wt. % to about 1 wt. % hydrocolloids.

4. The imitation cheese composition of claim 1, wherein the solid fat content at room temperature is about 30 wt % to about 40 wt %, based on the total fat content.

5. The imitation cheese composition of claim 1 wherein the corn-derived food starch is selected from the groups consisting of cross-linked and/or substituted granular corn starches, thin boiling corn starch, and combinations thereof.

6. The imitation cheese composition of claim 1 wherein the corn-derived food starch is cross-linked and acetylated.

7. The imitation cheese composition of claim 1 wherein the fat to starch ratio is about 0.4 to about 1.3.

8. An imitation cheese composition comprising:
    liquid, non-interesterified/non-hydrogenated vegetable oil;
    fractionated vegetable oil;
    corn-derived food starch; and
    about 2 wt % to about 12 wt % potato-derived food starch,
    wherein the imitation cheese composition has an in-process viscosity of about 10,000 to about 30,000 cps. at about 160° F. and a melted diameter of about 1-1.75 inches when a ¼ inch thick disc of the imitation cheese composition is prepared having an initial diameter of about ⅞ inch and is heated for four minutes over a double broiler with a rolling boil,
    wherein the composition has a solid fat to liquid fat ratio of about 0.3 to about 0.7 at about 25° C.

9. The imitation cheese composition of claim 8 comprising:
   about 6 wt. % to about 15 wt. % liquid, non-interesterified/non-hydrogenated vegetable oil,
   about 3 wt. % to about 8 wt. % fractionated vegetable oil, and
   about 4 wt. % to about 15 wt. % corn-derived food starch.

10. The imitation cheese composition of claim 8 further comprising about 2 wt. % to about 4 wt. % gelatin and about 0.1 wt % to about 1 wt % hydrocolloids.

11. The imitation cheese composition of claim 8, wherein the solid fat content at room temperature is about 30 wt % to about 40 wt %, based on the total fat content.

12. The imitation cheese composition of claim 8 wherein the corn-derived food starch is selected from the groups consisting of cross-linked and/or substituted granular corn starches, thin boiling corn starch, and combinations thereof.

13. The imitation cheese composition of claim 8 wherein the corn-derived food starch is cross-linked and acetylated.

14. The imitation cheese composition of claim 8 wherein the fat to starch ratio is about 0.4 to about 1.3.

\* \* \* \* \*